United States Patent
Khosla et al.

(10) Patent No.: US 12,554,752 B2
(45) Date of Patent: Feb. 17, 2026

(54) PROCESSING NATURAL LANGUAGE QUERIES WITH API CALLS AND API EXECUTIONS

(71) Applicant: Amazon Technologies, Inc., Seattle, WA (US)

(72) Inventors: Sopan Khosla, Sunnyvale, CA (US); Vinayshekhar Bannihatti Kumar, Santa Clara, CA (US); Rashmi Gangadharaiah, San Jose, CA (US); Deepak Seetharam Nadig, San Jose, CA (US); James W. Horsley, Carnation, WA (US); Abhijit S Barde, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 18/344,747

(22) Filed: Jun. 29, 2023

(65) Prior Publication Data

US 2025/0005051 A1 Jan. 2, 2025

(51) Int. Cl.
*G06F 16/3329* (2025.01)
*G06F 9/54* (2006.01)
*G06F 16/334* (2025.01)

(52) U.S. Cl.
CPC .......... *G06F 16/3329* (2019.01); *G06F 9/547* (2013.01); *G06F 16/3344* (2019.01)

(58) Field of Classification Search
CPC .......................... G06F 16/3329; G06F 16/3344
(Continued)

(56) References Cited

U.S. PATENT DOCUMENTS 11,860,914 B1 * 1/2024 Qadrud-Din ............ G06F 40/56
11,972,223 B1   4/2024 DeFoor et al.
(Continued)

FOREIGN PATENT DOCUMENTS

WO  WO-2016191737 A2 * 12/2016  ............. H04W 4/50
WO  WO 2020/219476      10/2020
WO  WO 2025/006458       1/2025

OTHER PUBLICATIONS

International Search Report and Written Opinion, re PCT Application No. PCT/US2024/035401, mailed Nov. 29, 2024.
(Continued)

*Primary Examiner* — Bharatkumar S Shah
(74) *Attorney, Agent, or Firm* — KNOBBE, MARTENS, OLSON & BEAR, LLP

(57) ABSTRACT

Systems and methods are provided for a natural language question answering service to provide answers to natural language questions regarding network-based services or computing domains. The natural language question answering service may receive the natural language question from a customer computing device. An aggregator of the natural language question answering service can retrieve passages from search systems based on the question and generate a prompt. A large language model (LLM) of the natural language question answering service may receive the prompt and provide an answer. The answer may be verified by a verifier of the natural language question answering service. Attribution may be applied to the answers and retrieved passages to produce references, inline citations, and similar questions. A watermarking module of the natural language question answering service may watermark the answer if it is verified.

20 Claims, 5 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 12,057,032 B1* | 8/2024 | Khanwalkar | ............ | G09B 7/08 |
| 12,080,187 B1* | 9/2024 | Ferrucci | .................. | G06F 40/30 |
| 2010/0153094 A1 | 6/2010 | Lee et al. | | |
| 2016/0360336 A1* | 12/2016 | Gross | .................... | H04W 4/025 |
| 2018/0075131 A1 | 3/2018 | Van Hoof et al. | | |
| 2019/0163714 A1* | 5/2019 | Ma | ...................... | G06F 16/2465 |
| 2019/0318011 A1* | 10/2019 | Teran Guajardo | .... | G06F 16/906 |
| 2020/0356610 A1* | 11/2020 | Coimbra | ................. | H04L 63/10 |
| 2021/0089594 A1* | 3/2021 | Xiong | ...................... | G06N 3/08 |
| 2021/0133224 A1 | 5/2021 | Tiwari et al. | | |
| 2022/0343236 A1* | 10/2022 | Daub | ................. | G06Q 10/0635 |
| 2022/0405484 A1* | 12/2022 | Kanchibhotla | ....... | G06F 40/137 |
| 2022/0414456 A1* | 12/2022 | Malaya | ................ | G06N 3/0475 |
| 2023/0133522 A1 | 5/2023 | Zhao et al. | | |
| 2023/0325420 A1 | 10/2023 | Pickens | | |
| 2024/0185022 A1* | 6/2024 | Akimoto | ................ | G06N 3/006 |
| 2024/0289559 A1 | 8/2024 | Gajek et al. | | |
| 2024/0320257 A1* | 9/2024 | Amoateng | .......... | G06F 16/9535 |
| 2024/0354436 A1* | 10/2024 | Mukherjee | .......... | G06F 16/3344 |
| 2025/0005052 A1 | 1/2025 | Khosla et al. | | |
| 2025/0005057 A1 | 1/2025 | Khosla et al. | | |
| 2025/0005058 A1 | 1/2025 | Khosla et al. | | |
| 2025/0007790 A1 | 1/2025 | Marwah et al. | | |
| 2025/0045256 A1* | 2/2025 | Gottlob | ................ | G06F 16/211 |

OTHER PUBLICATIONS

Ji, et al., "Survey of Hallucination in Natural Language Generation," ACM Computing Surveys, vol. 55, No. 12, Article 248, Publication date: Mar. 2023.

* cited by examiner

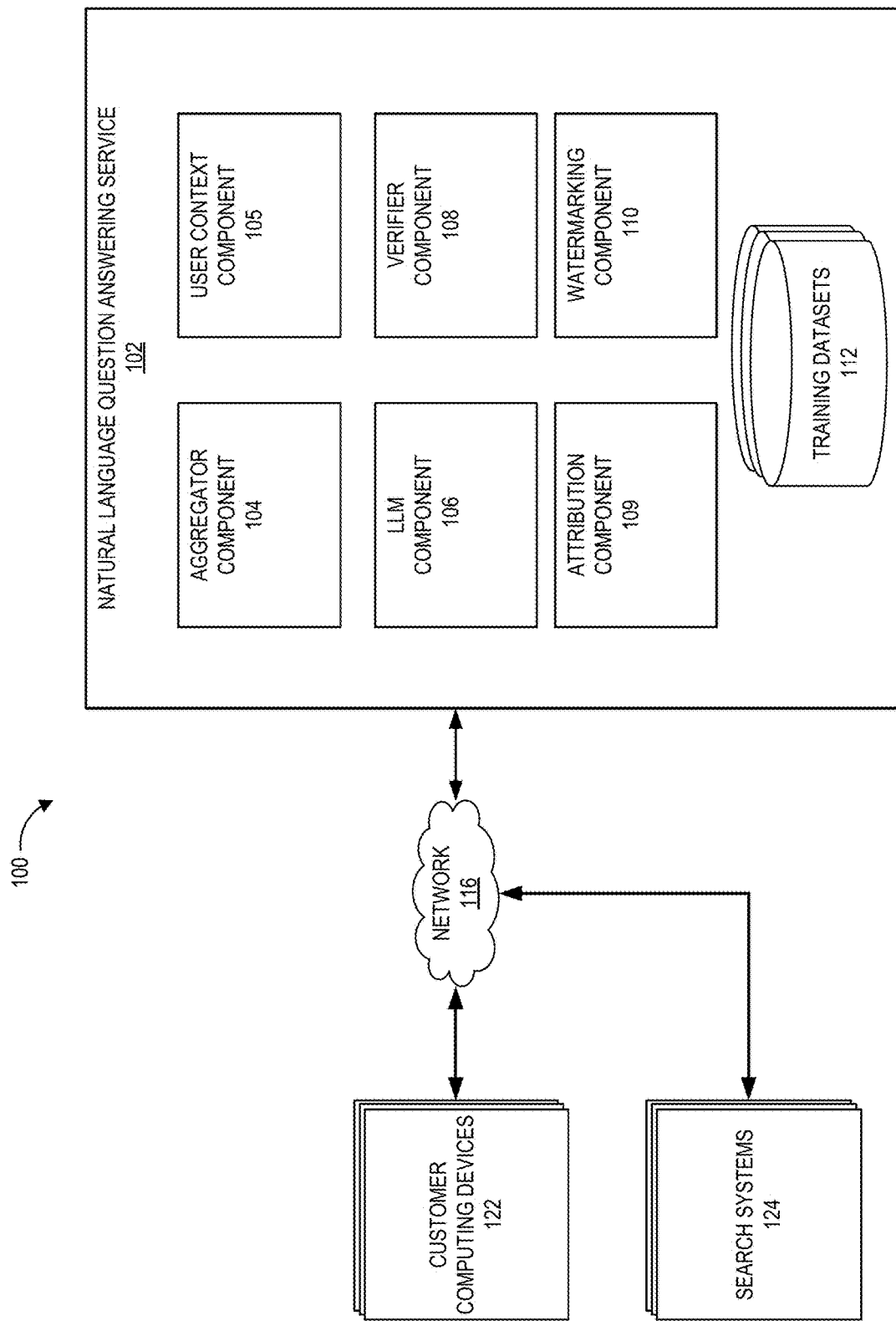

PROCESSING NATURAL LANGUAGE QUERIES WITH API CALLS AND API EXECUTIONS

BACKGROUND

Generally described, computing devices and communication networks can be utilized to exchange data or information. In a common application, a computing device can request content from another computing device via the communication network. For example, a client having access to a computing device can utilize a software application to request content from a server computing device via the network (e.g., the Internet). In such embodiments, the client's computing device can be referred to as a client computing device, and the server computing device can be referred to as a content provider.

In some applications, the network service provider can instantiate various network-based services that can process client requests for data. For example, network-services related to query processing or question answering assistants (e.g., chatbots) can correspond to network-based services that interact with humans to provide information.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 1 depicts a block diagram of an environment for a natural language question answering service that includes one or more customer computing devices and a network service including search systems component, an aggregator component, a user context component, a large language model (LLM) component, a verifier component, and a watermarking component in accordance with aspects of the present application;

DETAILED DESCRIPTION

Figure 2A:
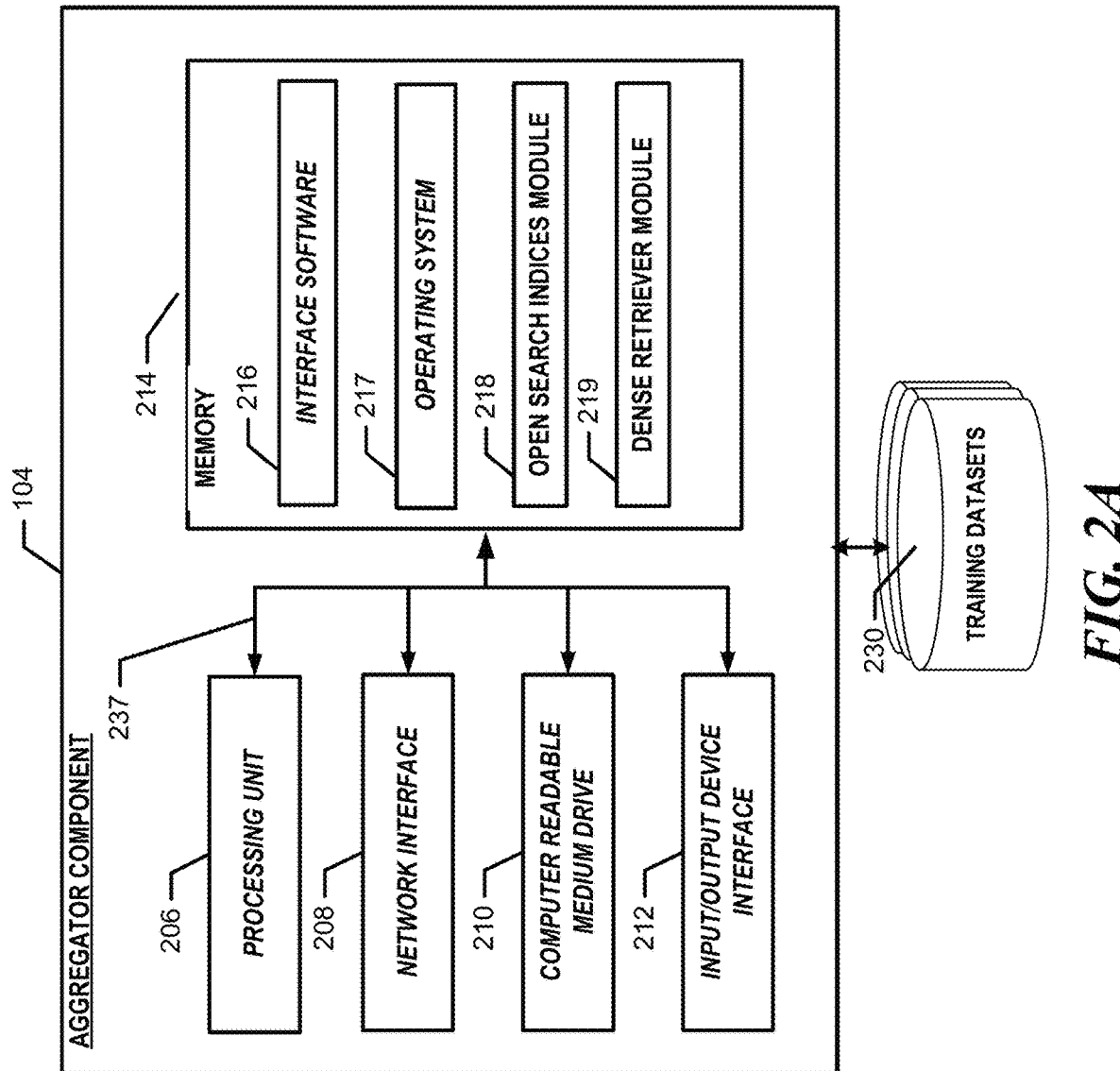
FIG. 2A is a block diagram of illustrative architecture of an aggregator component to retrieve passages and question and answer (QA) pairs from search systems based on a natural language question in accordance with aspects of the present application.

Aspects of the present disclosure relate to systems and methods for providing a network-based service for natural language question processing. More specifically, one or more aspects of the present application can include a network-based service for processing natural language queries (e.g., questions, prompts, commands, etc.) provided by a computing device to supplement, optimize, or otherwise modify the natural language query. One or more aspects of the present application can include a network-based service for further processing natural language queries utilizing LLM-based processing resources based on processed queries and processing result validation.

Generative artificial intelligence (AI) models (e.g., large language models (LLM), question answering assistants, chatbots, etc.) while, at times may answer a natural language question accurately (e.g., gives an answer to a question which requires no follow up question), are known to have issues. For example, they tend to be trained on a large amount of internet data extracted from a certain period (e.g., 2017-2019). Therefore, models that are not trained on recent internet data lack the ability to answer questions regarding this recent internet data (e.g., who won the 2021 NBA Finals?). Furthermore, since generative AI models are trained on public internet data, they lack the ability to answer questions regarding private data (e.g., information specific to, and regarding, a network-based storage service provider's internal troubleshooting guidelines, a system's internal frequently asked questions (FAQ), etc.). Moreover, natural language questions themselves have their own issues. For example, regardless of how accurate a generative AI model is, a natural language query may be entered (e.g., words used, order of words, etc.) in a manner (e.g., faulty, not sufficiently broad enough, etc.) such that a generative AI model generates an answer that is (i) incomplete or incorrect in reference to the question or (ii) fails to capture the intent of the drafter of the question. This can result in inefficient use of resources of a generative AI model (e.g., multiple question and answer turns not resulting in an answer agreeable to the entity which entered the question). Additionally, even if the natural language question is not faulty or too narrow, generative AI models may still generate an answer that is determined to be in error or incorrect (e.g., did not really answer the question, the answer is not justified by training data of the generative AI, a generative AI model generates an answer different from what is expected, etc.), which is also called "hallucination." Answers generated in error can happen when questions about particular private network-based services are asked because the public internet does not have this private information to train a generative AI model.

To address at least a portion of the above-described deficiencies, the natural language question answer service can implement one or more modules to answer natural language questions concerning specific network-based services and/or computing domains. The natural language question answer service can provide detailed answers (e.g., processing results) regarding network-based services and computing domains by referencing search systems which have question and answer (QA) pairs specifically generated for question answering services. Moreover, the natural language question answer service may utilize stored information to rephrase a natural language question such that an answer is generated to result in a more accurate answer than prior to the rephrasing.

Illustratively, the natural language question answer service can utilize an aggregator to retrieve passages (and corresponding question answer pairs (QA pairs) for those passages) based on the natural language question, to modify, update, or supplement the natural language question, or the like, and produce a prompt. The aggregator may analyze the natural language question and determine what search systems to retrieve passages and QA pairs from, to answer that question. The aggregator may retrieve those passages (and related QA pairs) and use them, along with the question, to formulate a prompt. For purposes of the present application, prompt can correspond to a few selected passages (e.g., from all the passages retrieved) and the QA pairs of the selected passages, along with the natural language question (e.g., or a form of the question where question may be a prompt or a command).

In some embodiments, the natural language question answer service can utilize a trained large language model (LLM) to use the prompt and generate an answer to the natural language question. The LLM may be a trained machine learning model utilizing Retrieval Augmented Generation (RAG) techniques to generate answers using semantics (e.g., in addition to or alternatively to lexical techniques) to answer the question. The LLM may be trained at least on QA pairs from search systems associated with network-based service providers (e.g., regarding network-based storage service, network-based analytics, etc.) such that the LLM may generate answers that are specific to those network-based service providers.

Illustratively, the natural language question answer service can utilize a verifier to verify the answer generated by the LLM to ensure it was not generated in error (e.g., hallucinated). The verifier may utilize one or more modules to ensure the answer was not generated in error. A textual overlap module of the verifier can determine how much overlap in text there is in the answer and the retrieved passages. A textual natural language inference (NLI) module of the verifier may determine whether the answer generated from the LLM contradicts the retrieved passages from the aggregator by using a premise and hypothesis. A relational NLI module of the verifier may determine whether the answer generated from the LLM is not generated in error in relation to the natural language question by using head, tail, and relation triples. Also, a membership inference attack module of the verifier may determine whether the question is similar to a previous question and is in a training set of the LLM.

In some embodiments, the natural language question answer service can utilize a watermarking component to watermark a verified answer from the LLM. The watermarking component may modify (e.g., regenerate) the verified answers such that the answers are proprietary to the natural language question answer service. In some embodiments, the watermark may include a hidden pattern in the regenerated verified answers that is imperceptible by humans while making the hidden pattern algorithmically identifiable as synthetic by a system (e.g., the natural language question answer service).

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1 depicts a block diagram of an embodiment of the environment 100. The environment 100 can include a network 116, the network connecting a number of customer computing devices 122 to one or more network-based services, illustratively, a natural language question answer service 102. Furthermore, the natural language question answering service 102 can receive natural language questions (e.g., about a certain network-based service) from the customer computing devices 122 and can use an aggregator component 104, user context component 105, large language model (LLM) component 106, verifier component 108, attribution component 109, watermarking component 110, and training datasets 112 to answer the natural language question. The natural language question answer service 102 illustratively includes (or has access to) one or more search systems 124. Moreover, the various aspects associated with the natural language question answering service 102 can be implemented as one or more components that are associated with one or more functions, services, machine learning models, among other components. The components may correspond to software modules implemented or executed by one or more customer computing devices, which may be separate stand-alone customer computing devices. Accordingly, the components of the natural language question answering service 102 should be considered as a logical representation of the service, not requiring any specific implementation on one or more customer computing devices.

Network 116, as depicted in FIG. 1, connects the devices and modules of the system. The network can connect any number of devices. The network 116 may be a personal area network, local area network, wide area network, over-the-air broadcast network (e.g., for radio or television), cable network, satellite network, cellular telephone network, or combination thereof. As a further example, the network 116 may be a publicly accessible network of linked networks, possibly operated by various distinct parties, such as the Internet. In some embodiments, the network 116 may be a private or semi-private network, such as a corporate or university intranet. The network 116 may include one or more wireless networks, such as a Global System for Mobile Communications (GSM) network, a Code Division Multiple Access (CDMA) network, a Long-Term Evolution (LTE) network, or any other type of wireless network. The network 116 can use protocols and components for communicating via the Internet or any of the other aforementioned types of networks. For example, the protocols used by the network 116 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some embodiments, the natural language question answering service 102 generates processing results (e.g., answers) in response to queries (e.g., question, prompt, command, etc.) submitted by customer computing devices 122 via the network 116. In other embodiments, the natural language question answering service 102 retrieves passages from search systems via the network 116 to provide answers to questions (e.g., which can be in a form of a natural language question, prompt, command, etc.). The natural language question answering service 102 may utilize machine-learned algorithms, such as generative AI model algorithms, to provide answers (e.g., information regarding a specific network-based service, passages associated with a network-based service, links to webpages, application programming interface (API) calls, etc.) to natural language questions catered to network-based services (e.g., network-based computing resources, network-based on-demand code execution, network-based analytics, network-based storage, network-based databases, network based AI, etc.) and/or specific computer domains (e.g., website dedicated to social media software for sharing pictures, website dedicated to a retail service provider selling products and services, etc.). For example, the natural language question answering service 102 can have access to different search systems (e.g., the search systems 124) where the search systems may store passages and question and answer pairs (QA pairs) regarding a particular network-based service (e.g., questions and answer pairs for a specific network-based storage product) or computing domain (e.g., website of a clothing designer). The natural language question answering service 102 may comprise a trained LLM that is trained at least on the QA pairs from the search systems 124 in order to provide answers to questions and prompts. Accordingly, the components of the natural language question answering service 102 should be considered as a logical representation of the service, not requiring any specific implementation on one or more customer computing devices.

The customer computing devices 122 in FIG. 1 can connect to the natural language question answering service 102 via the network 116. The customer computing devices 122 can send natural language questions (e.g., input from a user via a user interface (UI) of the customer computing devices 122) to the natural language question answering service 102 and receive answers from the natural language question answering service 102 based on the natural language question. The customer computing devices 122 can be configured to have at least one processor. That processor can be in communication with the memory for maintaining computer-executable instructions. The customer computing devices 122 may be physical or virtual. The customer computing devices 122 may be mobile devices, personal computers, servers, or other types of devices. The customer computing devices 122 have a display and input devices through which a user can interact with the user-interface component.

The search systems 124 in FIG. 1 can connect to the natural language question answering service 102 via the network 116. The search systems 124 may be a part of (e.g., an offered service of the natural language question answering service 102) or associated with the natural language question answering service 102. Additionally, or alternatively, the search systems 124 may also be hosted outside the network 116 (e.g., a third-party service). The search systems 124 may be a plurality of search systems which can provide, but are not limited to, passages, documents, and QA pairs to the natural language question answering service 102. The natural language question answering service 102 may take that information and formulate an answer to a natural language question related to a network-based service and/or computer domain. For example, a search system 124 may be a data store which contains frequently asked questions (FAQ) (and associated answers) concerning a specific network-based service (e.g., network-based storage or database).

The aggregator component 104 can retrieve passages from the search systems 124 based on the natural language question and create a prompt for the LLM component 106. For example, the aggregator component 104 may analyze the natural language question by using string matching techniques (e.g., partial string matching, dense passage retrieval, etc.) to determine the meaning of the natural language question. After determining the meaning of the natural language question, the aggregator component 104 may then determine which of the search systems 124 the aggregator component 104 may retrieve passages from (e.g., retrieve from a network-based storage service QA pair system but not a network-based AI service QA pair system) based on the natural language question. Based on the retrieved passages (e.g., documents, text of the documents, pictures of the documents, or video of the documents, etc.) from the search systems 124, the aggregator component 104 may create a prompt for the LLM component 106 to answer, where the prompt from the aggregator component 104 to the LLM component 106 may contain some of the retrieved passages and a form of the natural language question. The aggregator component 104 may be a machine learning model trained on Retrieval Augmented Generation (RAG) techniques.

The user context component 105 can optionally capture and store user context of at least users associated with the customer computing devices 122. The user context component 105 can share the user context with the LLM component 106 (e.g., or the aggregator component 104 can share the user context along with other information to the LLM component 106) along with the question and relevant passages from aggregator component 104. For example, the user context component 105 may capture context information regarding a user's account concerning network-based services. In this example, the user context captured by the user context component 105 may be; information such as the type of services the user subscribes to (e.g., user subscribes to network-based storage services but not network-based AI services); system help information accessed regarding network-based services or any of the search systems 124 (e.g., user accessed a FAQ page regarding a network-based analytics service, user logged a ticket with IT related to a network-based database service, user talked to a help support line regarding a network-based on-demand compute service, etc.); billing related information associated with the user (e.g., which network-based services the user subscribes to and what premium services the user subscribes to regarding those network-based services, etc.); geolocation information associated with the user (e.g., where the user accessed the network-based services, the residence location that the user gave to the network-based services of where the user resides, etc.); and how the user utilized the network-based services such as by accessing telemetry information (e.g., average or mean time the user spent on different network-based services, which services within a network-based service the user used such as the user using generative artificial intelligence models but not linear regression artificial intelligence models, etc.). The user context component 105 may retrieve or receive information used associated with the user context information from the customer computing devices 122, from the natural language question answering service 102, or external systems or services (e.g., a third-party provider which tracks user context by receiving user context details, organizing those user context details and sends them to the natural language question answering service 102 or the user context component 105).

The LLM component 106 may receive the prompt from the aggregator component 104, the user context (optionally) from user context component 105, and generate one or more answers based on the prompt and the user context. The LLM component 106 may be trained on at least QA pairs generated from the search systems 124 or knowledge graphs of customers of network-based services (e.g., a network-based on-demand computing service which is serverless, etc.). The LLM component 106 may take the prompt and the user context received from the aggregator component 104 and utilize a generative AI model (e.g., Retrieval Augmented Generation (RAG) utilizing natural language processing (NLP) architecture) to determine an answer to the natural language question. For example, if the customer computing devices 122 sends a natural language question regarding how to setup a type of network-based storage, the LLM component 106 may utilize a trained generative AI model (e.g., trained on QA pairs from a network-based storage service and customer knowledge graphs) to determine an answer (e.g., where the answer provides the instructions and potential API calls to setup the network-based storage) from the prompt received from the aggregator component 104.

The verifier component 108 can verify that the one or more answers from the LLM component 106 were not generated in error (e.g., did not answer the question, the answer is not justified by training data of the LLM component 106, the LLM component 106 generates an answer different from what is expected, etc.). The verifier component 108 may utilize different techniques (e.g., detoxification model, natural language inference (NLI) triples, membership inference attacks, etc.) to determine if the answer was generated in error (also referred to as "hallucination" and/or one of its derivatives). For example, the verifier component 108 may utilize a detoxification model that filters for obscene language and/or profanity such that the language is not provided in the answer.

The attribution component 109 can provide various functions related to search result information utilized in the aggregation functionality of the aggregator component 104. Such functions can illustratively include references or other source identifiers to the retrieved passages, inline citations to sentences from retrieved passages in answers, and provide similar questions to the original question posed. For example, the attribution component 109 may provide links (e.g., uniform resource identifiers (URI)) or titles as references (e.g., links to webpages, links to online documents, links to images, audio, video, etc.) to documents whose passages were retrieved by the aggregator component 104. As another example, the attribution component 109 may take the answers provided by the LLM component 106 and inline cite any sentences retrieved directly (e.g., verbatim) from any of the passages retrieved by the aggregator component 104. As another example, the attribution component 109 may provide similar questions asked to the current natural language question posed (e.g., current question is regarding creating a network-based storage bucket and similar question is regarding reading from a network-based storage bucket).

The watermarking component 110 can watermark the verified one or more answers by generating or adding patterns (e.g., not readable by humans) to the verified one or more answers such that the natural language question answering service 102 may identify the text of the one or more answers. For example, the watermarking component 110 may re-generate (e.g., embedding signals into the answers) the one or more answers in a combination of words (e.g., unreadable pattern by humans) such that the combination of words would leave a footprint on them that can be used to recognize the natural language question answering service 102 as the generator of the watermarked answers (e.g., re-wording an answer where the re-worded answer has the same content as the original answer but the re-worded answer can be identified to be generated by the natural language question answering service 102 by reviewing a short span of words from within the answer). Therefore, a watermark in this context may be used to at least determine if the answer of the natural language question answering service 102 was plagiarized.

The training datasets 112 may contain trained machine learned data for any of the aggregator component 104, LLM component 106, verifier component 108, attribution component 109, or watermarking component 110. The training datasets 112 may contain trained data from QA pairs of one of the search systems 124 such that the trained data may identify the types of relevant passages for certain types of natural language questions. For example, the LLM component 106 may utilize the training datasets 112 to determine whether associated passages and QA pairs are enough to produce an answer to the natural language question. The training datasets 112 may be updated periodically with new QA pair training data. Moreover, the training datasets 112 may also contain information about customers (e.g., subscribed services, usage activity, preferences, etc.) via knowledge graphs of a network-based service or computing domain.

FIG. 2A depicts one embodiment of an architecture of an illustrative aggregator component 104 of the natural language question answering service 102. As described herein, the aggregator component 104 can be configured to determine relevant passages from the search systems 124 (e.g., particular network-based services and/or computer domains, etc.) based on a natural language question. As described below, the aggregator component 104 may utilize string matching techniques (e.g., partial string matching, dense passage retrieval (DPR), etc.) to determine a semantic meaning of the natural language question. The aggregator component 104 may take that meaning of the question and utilize it to determine which search systems 124 to retrieve passages from. Additionally, the aggregator component 104 may then retrieve passages from the determined search systems 124 and create a prompt utilizing the passages and the natural language question (e.g., or a form of that question). As stated herein, the aggregator component 104 may be implemented through use of machine learning models (e.g., generative AI models, etc.) and RAG techniques.

The network interface 208 may provide connectivity to one or more networks or computing systems, such as the network 116 of FIG. 1. The processing unit 206 may thus receive information and instructions from other computing systems or services via a network. The processing unit 206 may also communicate to and from memory 214 and further provide output information for an optional display (e.g., via a UI) via the input/output device interface 212. In some embodiments, the aggregator component 104 may include more (or fewer) components than those shown in FIG. 2A.

The memory 214 may include computer program instructions that the processing unit 206 executes in order to implement one or more embodiments. The memory 214 generally includes RAM, ROM, or other persistent or non-transitory memory. The memory 214 may store an operating system 217 that provides computer program instructions for use by the processing unit 206 in the general administration and operation of the aggregator component 104. The memory 214 may further include computer program instructions and other information for implementing aspects of the present disclosure. For example, in one embodiment, the memory 214 includes interface software 216 for communicating with other components and/or modules of the natural language question answering service 102 to generate a prompt from passages and the natural language question.

As described herein, the aggregator component 104 may use partial string matching (e.g., also known as "fuzzy string matching") techniques to determine meaning from the natural language question. As used in this disclosure, partial string matching may be a technique of finding strings that match with a given string partially and not exactly. The algorithm behind partial string matching may not simply look at the equivalency of two strings but may rather quantify how close two strings are to one another. This may be done via a distance metric known as "edit distance" which determines the closeness of two strings by identifying the minimum alterations needed to be done to convert one string into another. Different types of edit distances that can be used are Levenshtein distance, Hamming distance, Jaro distance, etc. For example, a user of the customer computing devices 122 may misspell (typing "Londin" instead of "London") a word or enter a word partially (e.g., as a part of a natural language question) into a user interface which is connected with the natural language question answering service 102, in this example, partial string matching techniques may help in finding the right word, words, or phrases.

Once the meaning of the natural language questions is determined, the aggregator component 104 may then determine which search systems 124 should be utilized to retrieve passages from. For example, if the aggregator component 104 determined that the natural language question involved a query for determining how to download content from a network-based storage service, then the aggregator component 104 may retrieve passages from a search system 124 that is associated with, or is, a network-based storage service. As another example, if the aggregator component 104 determined that the natural language question involved a query for how to use a certain function (e.g., function to perform payroll calculation remotely) in a network-based on-demand code execution system, then the aggregator component 104 may retrieve passages (and QA pairs) concerning that function from a search system 124 that is, or associated with, a network-based on-demand code execution system.

Additionally, the memory 210 may include an open search indices module 218 for determining which documents from the passages retrieved are relevant to the natural language question. In some embodiments, the open search indices module 218 analyzes the retrieved documents and perform a surface level matching of the documents with the natural language question. In some embodiments, the open search indices module 218 may perform surface level matching by detecting or looking for keyword and phrase-level similarities between a pair of natural language content (e.g., pair being the passages retrieved and the natural language question). For example, if content 1 may state "network-based services provides cloud computing service" and content 2 may state "network-based services offers reliable, scalable, and inexpensive cloud computing services," the surface-level similarities would be the presence of "network-based service" and "cloud computing service". As another example, one-hundred documents may have been retrieved from different search systems 124 and a surface level matching may have determined that ten of those documents are relevant. As such, the open search indices module 218 may be used to identify whole documents in network-based service systems (e.g., network-based repository for documents related to using a network-based storage service).

Additionally, the memory 210 may include a dense retriever module 219 for determining the relevant parts of each document retrieved from the search systems 124. The dense retriever module 219 may be created using dense embedding (encoder) models that can aim to capture the most salient semantic parts of each document retrieved (e.g., from search systems 124) and convert them into a fixed-dimensional dense representation that can be used to create a matrix of fixed-dimensional vectors. To perform retrieval, the dense retriever module 219 may transform the natural language question into a similar dense embedding and find the K nearest neighbors from an index matrix. As such, the dense retriever module 219 may be used to identify dense passages of text in network-based services (e.g., network-based service that stores crowd sourced answers on how to use and debug a network-based analytics service).

The aggregator component 104 may use a plurality of search systems 124 to retrieve passages from, and also receive QA pairs. For example, but not limited to, a search system may be network-based system that contains documents describing how to use a network-based service (e.g., manuals regarding how to use a network-based artificial intelligence and machine learning service via a graphical user interface (GUI)). The aggregator component 104 may identify QA pairs associated with this type of question by tagging the titles of each document and associating each title with question where the title is an answer to a question.

As another example, a search system may be a network-based system (or associated with a network-based system) that contains webpages written by support professionals for a network-based service to address the top issues faced by the customers of that network-based service (e.g., for computing, storage, analytics, AI, etc.). In this system, each webpage may detail how to solve an issue (e.g., technical question) related to functionality of a network-based service. The aggregator component 104 may utilize Python functions (e.g., BeautifulSoup) to scrape the webpages to extract QA pairs (e.g., using the title of each page as a potential answer to a question in a QA pair).

As another example, a search system may be a network-based system (or associated with a network-based system) that contains crowd sourced questions and answers regarding network-based services (e.g., for computing, storage, analytics, AI, etc.). These crowd sourced question and answers may be provided by the users of this network-based system. The aggregator component 104 may utilize a structured query language (SQL) to create QA pairs with crowd sourced posts that have been tagged by an author of that post for a specific network-based service (e.g., a tag of how to create a bucket in a specific network-based service). Moreover, the aggregator component 104 may create QA pairs with posts which have a crowd sourced acceptance (e.g., a majority of the crowd source system users mark the post as an accepted answer) or a particular number of upvotes (e.g., only retrieve posts with at least 5 upvotes).

As another example, a search system may be a network-based system (or associated with a network-based system) that contains support tickets by customers of a network-based service and the resulting resolutions (e.g., customer can't get into network based storage service, troubleshooting when a server goes down, etc.). In this search system, a customer can create a support ticket case with a title of the case and a detailed description of the issue related to the case. Agents of this search system may analyze the case and suggest ways to resolve the issue related to case and also annotate the case (e.g., issue related to debugging a network-based server when it is experiencing lag issues). The aggregator component 104 may search for support tickets by annotations and create QA pairs with resolved cases as an answer to a potential question.

As another example, a search system may be a network-based system (or associated with a network-based system) that contains quizzes or tests (e.g., and their answers and how the customers performed, etc.) for customers of a network-based service to learn about how to use the network-based service. The aggregator component 104 may use the results of the quizzes or test to create QA pairs where certain quizzes or tests may be the answer to a question (e.g., natural language question requests tests to help a user be better trained on a network-based AI system, etc.).

As another example, a search system may be a network-based system (or associated with a network-based system) that contains FAQ passages, documents, multimedia, and the like, for customers of a network-based service. The aggregator component 104 may create QA pairs from the FAQ passages (e.g., answers to an FAQ page is an answer in a QA pair and the question in a FAQ page is the question in the QA pair).

As another example, a search system may be a network-based system (or associated with a network-based system) that contains training materials (e.g., videos, documents, interactive quizzes, etc.) for a network-based service. The aggregator component 104 may create QA pairs where the training materials may be answers to certain QA pairs.

As another example, a search system may be a network-based system (or associated with a network-based system) that contains internal questions of employees (e.g., support staff, engineers, etc.) of a network-based service (e.g., related to an issue that employee faces with the network-based service, etc.) for a network-based service. The aggregator component 104 may create QA pairs where the answers to the employee questions may be an answer in the QA pair, and the question of the employee may be the question of the QA pair.

As another example, a search system may be a network-based system (or associated with a network-based system) that contains knowledge graphs of customers for a network-based service (e.g., what kind of services they have, their usage activity, questions the customers have previously asked, types of questions customers have asked and their occurrence, their preferences regarding answers, etc.). The aggregator component 104 may utilize the knowledge graphs to create QA pairs where information about a customer may be an answer in a QA pair (e.g., the customer has 25 buckets in a network-based storage service) and a question from the customer may be a question in the QA pair (e.g., "how many buckets do I have in this network-based storage service?").

The aggregator component 104 may also use a similarity score to determine which passages retrieved are relevant (e.g., not out of scope). The retrieved passages may be sent through a dense encoder and to get their dense embeddings. Scores may be generated by the aggregator component 104 for each passage in relativity to the natural language question (e.g., how well the passage is related to the question). The passages which pass a certain threshold (e.g., greater than 0.5) may be kept while passages under a certain threshold may not be kept (e.g., less than or equal to 0.5). The passages that are not kept may be deemed out of scope by the aggregator component 104.

As also described herein, the aggregator component 104 may use dense passage retrieval (DPR) techniques to determine which passages from the search systems 124 are relevant to use as a prompt to the LLM component 106. DPRs are generally known as techniques for open-domain question answering that may aim to retrieve relevant passages from a large corpus of unstructured text. Unlike traditional information retrieval techniques that can rely on sparse representations, the aggregator component 104 may use DPR techniques and dense representations adapted from deep neural networks where these techniques may be used to encode text passages and questions. Moreover, the aggregator component 104 may use DPR techniques to precompute dense vector representations of text and store them in a search index. For example, the aggregator component 104 may use DPR techniques for dense representations comprehended from deep neural networks to encode text passages and questions. Given a question or query, the aggregator component 104 may use DPR techniques to retrieve relevant passages from an index based on the similarity between their representations and the representation of a query or question. Once the relevant passages are retrieved, the aggregator component 104 may use a downstream model to extract answers from the question asked.

The aggregator component 104 can create a prompt based on the relevant passages determined and the natural language question. The aggregator component 104 may create a prompt that contains some of the passages retrieved and QA pairs that are associated with those passages. The aggregator component 104 may also create the prompt by adding QA pairs of those passages to the prompt. For example, the aggregator component 104 can take some passages from a document on how to setup a network-based storage bucket and at least part of the natural language question to formulate a prompt (e.g., and also take the QA pairs that are associated with that document). Additionally, the aggregator component 104 may add the question, or some form of the question, to the prompt.

Additionally, or alternatively, the aggregator component 104 may have access to training datasets 230. The aggregator component 104 may utilize one or more machine learning models (which reference the training datasets 230) to determine which search systems 124 to retrieve passages from. Moreover, the aggregator component 104 may utilize one or more machine learning models (which reference the training datasets 230) to determine which passages are relevant. These machine learning methods (which reference the training datasets 230) may be performed in addition to the methods and/or techniques described above and herein.

Figure 2B:
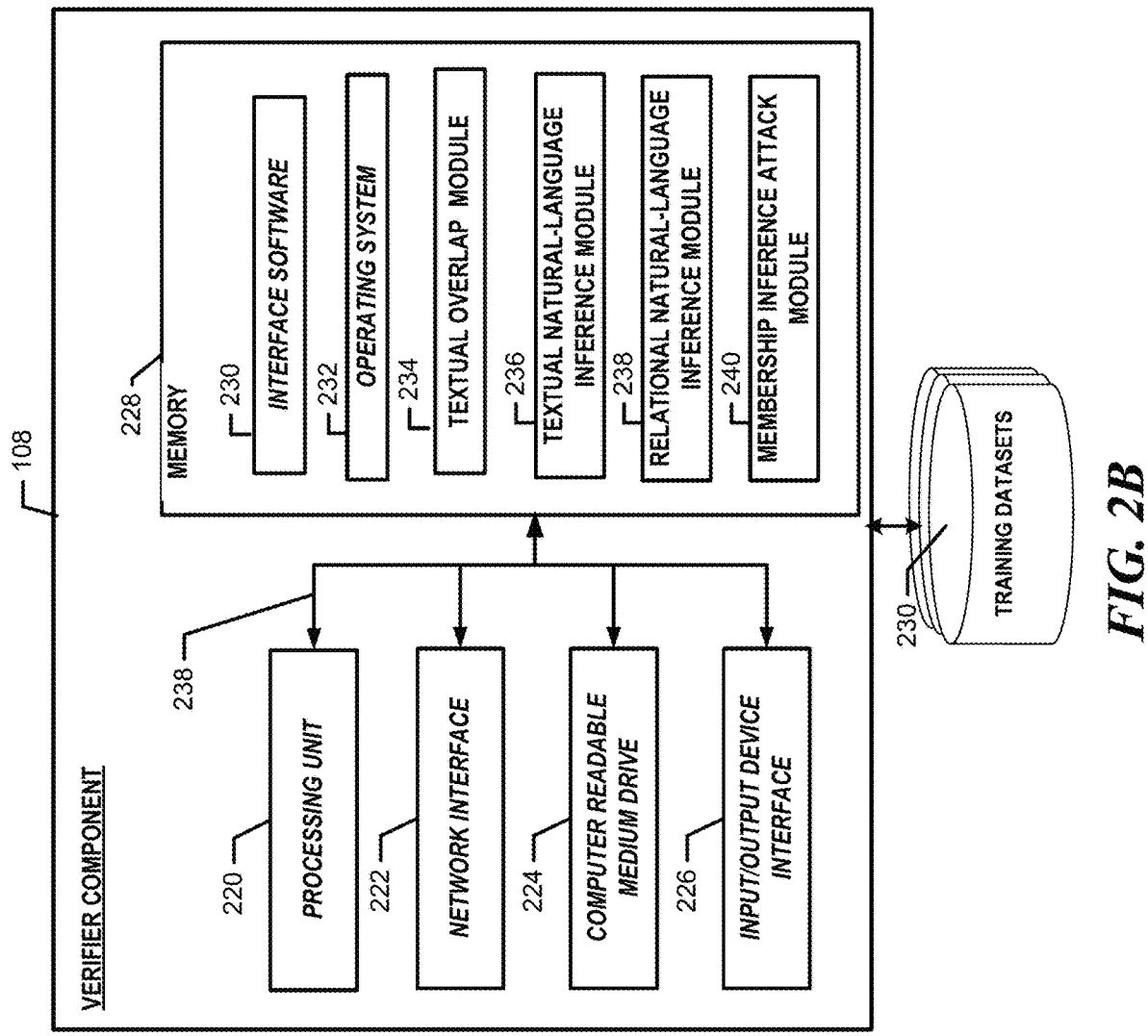
FIG. 2B is a block diagram of illustrative architecture of a verifier component to verify answers from a large language model (LLM) based on a natural language question in accordance with aspects of the present application.

FIG. 2B depicts one embodiment of an architecture of an illustrative verifier component 108. The verifier component 108 can be configured to analyze whether answers provided by the LLM component 106 are generated in error (e.g., did not answer the question, the answer is not justified by training data of the LLM component 106, the LLM component 106 generates an answer different from what is expected, etc.). As described below, the verifier component 108 can utilize different components to determine if the answer of the LLM component 106 was generated in error. The verifier component 108 may utilize a textual overlap module 234 to determine how much information was used by the LLM component 106 from the retrieved passages from the aggregator component 104. The verifier component 108 may utilize a textual natural language inference (NLI) module 236 to determine whether the answer generated from the LLM component 106 contradicts the retrieved passages from the aggregator component 104 by using a premise and hypothesis. The verifier component 108 may utilize a relational NLI module 238 to determine whether the answer generated from the LLM component 106 was generated in error in reference to the retrieved passages by using head, tail, and relation triples. Also, the verifier component 108 may utilize a membership inference attack module 240 to determine whether the natural language question is similar to questions previously asked by other customers and is in a training set of the LLM component 106. As illustrated, verifier component 108 includes a processing unit 220, a network interface 222, a computer-readable medium drive 224, and an input/output device interface 226, all of which may communicate with one another by way of a communication bus. The components of the verifier component 108 may be physical hardware components or implemented in a virtualized environment.

The network interface 222 may provide connectivity to one or more networks or computing systems, such as the network 116 of FIG. 1. The processing unit 220 may thus receive information and instructions from other computing systems or services via a network. The processing unit 220 may also communicate to and from memory 228 and further provide output information for an optional display via the input/output device interface 226. In some embodiments, the verifier component 108 may include more (or fewer) components than those shown in FIG. 2B.

The memory 228 may include computer program instructions that the processing unit 220 executes in order to implement one or more embodiments. The memory 228 generally includes RAM, ROM, or other persistent or non-transitory memory. The memory 228 may store an operating system 232 that provides computer program instructions for use by the processing unit 220 in the general administration and operation of the verifier component 108. The memory 228 may further include computer program instructions and other information for implementing aspects of the present disclosure. For example, in one embodiment, the memory 228 includes interface software 230 for communicating with other components or modules of the natural language question answering service 102 to verify answers of the LLM component 106.

Additionally, the memory 228 may include a textual overlap module 234 for determining how much information was used in an answer by the LLM component 106 from the retrieved passages from the aggregator component 104 in order to determine if the answer generated by the LLM component 106 was generated in error (e.g., hallucinated). The textual overlap module 234 may determine the textual overlap between an answer and the retrieved passages by using metrics techniques such as a recall calculation (e.g., true positive\(true positive+false negative)), an F1 score (e.g., 2×(precision*recall\precision+recall)), and the like.

The memory 210 may also include a textual NLI module 236 for determining whether the answer generated from the LLM component 106 contradicts the retrieved passages from the aggregator component 104 by using a premise and hypothesis. The textual NLI interpretation module 236 may use NLI models to determine if there is a contraction. The textual NLI interpretation module 236 may utilize NLI models to take two text sequences as input (e.g., a hypothesis and a premise), and determine whether the hypothesis is true (entailment), false (contradiction), or undetermined (neutral) given the premise. The textual NLI interpretation module 236 may use the NLI models to determine if the answer text (hypothesis) from the LLM component 106 is in contradiction with any of the passages retrieved (premises) from the aggregator component 104, if there is a contradiction the verifier component 108 may refrain from verifying the answer to show to the customer of the natural language question. The natural language question answering service 102 may use the LLM component 106 to generate another answer if a prior answer was in contradiction and use the verifier component 108 to verify the new answer.

Additionally, the memory 228 may include a relational NLI module 238 for determining whether the answer generated from the LLM component 106 is generated in error (e.g., or incomplete, etc.) in relation to the retrieve passages by using head, tail, and relation triples. The relational NLI module 238 may determine if the answer was generated in error by extracting (head, tail, relation) triples of entities mentioned in the answer generated by the LLM component 106 to the entities mentioned in the retrieved passages by the aggregator component 104. The relational NLI module 238 may use the extracted triples to create a knowledge graph which comprises of entities and relationships. The relational NLI module 238 may determine if the answer contains any triples that are contradictory to those extracted from the retrieved passages, if so, the relational NLI module 238 may deem the answer contradictory to a natural language question associated with those passages. For example, the NLI module 238 may identify that a head is a network-based service stating that their offered service is reliable. As another example, the NLI module 238 may identify that a tail is the network-based service stating that their offered service is secure. As another example, the NLI module 238 may identify that a relation is the network-based service stating that their offered service is scalable.

The memory 210 may also include a membership inference attack module 240 for determining whether the natural language question is similar to questions previously asked by other customers and is in a training set of the LLM component 106. Generally, membership inference attacks may be a type of privacy attack that attempts to determine whether a particular record or individual were included in a machine learning model's training dataset. In other words, a potential attacker may try to determine if a specific datapoint was used to train the model or not. The potential attacker can launch a membership inference attack by using a separate dataset that is similar to the training dataset of the machine learning model. By feeding this dataset into the model and analyzing its output, the attacker may try to determine whether or not specific records were used to train the model. As used herein, the membership inference attack module 240 may use techniques from membership inference attacks as way to earn trust of a customer by showing answers where it can be inferred that a sample is present inside a training set. The membership inference attack module 240 may use these techniques to determine if a given sample (e.g., question or prompt) was present in the training distribution or not. The membership inference attack module 240 may use these techniques to infer if a sample (e.g., question or prompt) was present in the training set by adding additional complexities like "logit scaling" on top of the existing Loss attack. The natural language question answering service 102 may provide the generated answer only if there have been similar types of questions (or prompts) before in the training set of the LLM component 106 or if a similar sample was presented to the model at training.

The verifier component 108 may combine the four techniques by the modules above (textual overlap module 234, NLI module 236, relational NLI module 238, membership inference attack module 240) to determine whether an answer will be shown. For example, the verifier component 108 may use the outputs and scores of the above four techniques to create a threshold score and provide a generated answer if the score is above a threshold (e.g., greater than 0.5).

Moreover, the verifier component 108 may utilize a detoxification module (not shown) to determine whether generated answers should be sent to the customer computing device 122 that provided the natural language question. The detoxification module of the verifier component 108 may use filters to filter for certain types of answers (e.g., answer would provide information about a competitor of a network-based service, answer has profanity, answer has privacy information, etc.). In this example, the natural language question answering service 102 may provide a response back to the customer such as "I cannot answer this question."

Additionally, the verifier component 108 may have access to training datasets 230. The verifier component 108 may utilize one or more machine learning models (which reference the training datasets 230) to verify if generated answers should be returned to the customer computing devices 122. These machine learning methods (which reference the training datasets 230) may be performed in addition to the methods and/or techniques described above and herein.

Figure 3:
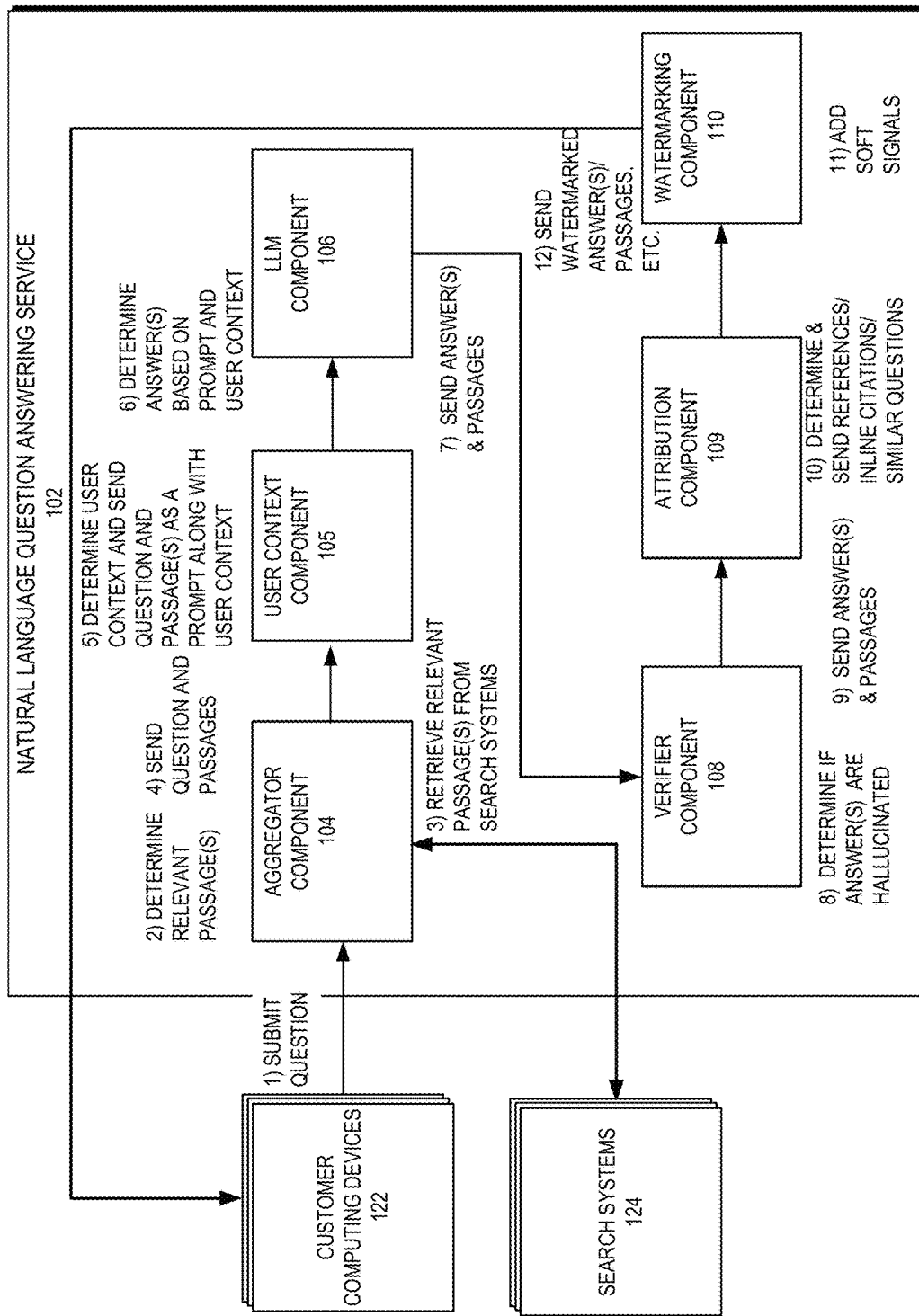
FIG. 3 is a block diagram of the environment of FIG. 1 depicting an illustrative interaction of different components of the natural language question answering service based on analyzing a natural language question in accordance with aspects of the present application.

FIG. 3 is an illustrative interaction of different components of the natural language question answering service 102 based on analyzing a natural language question (or prompt). At (1), a customer computing device 122 provides a natural language question (or prompt) to the natural language question answering service 102 (e.g., via a user interface (UI) of the customer computing device 122). This question (or prompt) may be input by a user of the customer computing devices 122 where the user is a customer of one or more network-based services (e.g., network-based storage, network-based on-demand code execution, etc.). The question (or prompt) may also be input via different methods (e.g., textual input of the question or prompt, audio input of the question or prompt, inputs generated by other generated models, etc.). Moreover, the input may be received via a graphical user interface, via APIs, or the like.

At (2), the natural language question answering service 102 utilizes the aggregator component 104 to determine relevant passages to retrieve from search systems 124. As described herein, the aggregator component 104 may utilize partial string techniques and DPR techniques to determine the meaning of the natural language question and also determine which network-based services or computing domains, passages should be retrieved from. At (3), the aggregator component 104 retrieves the passages from the search systems 124. Moreover, the aggregator component 104 may modify and supplement the question with the retrieved passages to form a prompt. The prompt may comprise selected passages and QA pairs for the LLM component 106 to provide an answer to.

At (4), the aggregator component 104 sends some of the passages retrieved and corresponding QA pairs to the user context component 105. At (5), the user context component 105 determines user context associated with a user of the customer computing device 122 and forwards the QA pairs, passages retrieved, and user context to the LLM component 106. It should be noted that (5) is optional and the aggregator component 104 may directly send the passages retrieved and the QA pairs to the LLM component 106 without user context. At (6), the LLM component 106 receives the prompt and user context and determines an answer to the natural language question. The LLM component 106 may utilize APIs to receive the prompt and the user context from the user context component 105 where the prompt may be formatted in a certain manner to be sent or communicated over an API.

As stated herein, the LLM component 106 may be a generative AI model that uses LLM techniques such as a RAG. The LLM component 106 may be trained on QA pairs from the search systems 124 such that the LLM component 106 has a corpus of text to understand questions about regarding each of the search systems 124 (e.g., and each of the network-based systems associated with the search systems 124). The LLM component 106 may be continually trained with introduction of new QA pairs, among other information. For example, the LLM component 106 may first be trained on data and tasks from the public internet such that the LLM component 106 may answer questions about general topics (e.g., without knowledge of specific private network-based services). Still in this example, the LLM component 106 may then be trained on specific network-based service information (e.g., passages and QA pairs about a certain network based service like a network-based on-demand code execution system, etc.). The LLM component 106 may also be trained using techniques such as Reinforcement Learning from Human Feedback (RLHF) to rank answers via user feedback.

The LLM component 106 may also be configured to process multiple questions (or prompts) from a user (e.g., customer of a network-based service or services) of a customer computing device 122 such that the LLM component 106 may utilize previous asked questions (or prompts) and previously provided answers to form an evidence pool. The evidence pool may be used to provide an answer to a current question. The LLM component 106 may store the multiple previous questions as conversational context. The LLM component 106 may utilize this evidence pool, current natural language question, and conversional context, to answer the current question. The LLM component 106 may update the evidence pool in different ways. In one example, the LLM component 106 may update the evidence pool with any questions and/or answers generated by the LLM component 106. In another example, the LLM component 106 may update the evidence pool if the LLM component 106 determines that the current evidence pool does not contain an answer to a natural language question. In this instance, the LLM component 106 may request more up to date passages to populate the evidence pool (e.g., from the aggregator component aggregator component 104). In another example, the LLM component 106 may use the evidence pool to determine if a current natural language question should be rewritten based on information in the evidence pool.

Moreover, the LLM component 106 may additionally be trained to provide and/or run application programming interface (API) commands in response to a natural language question or prompt (e.g., as a form of a command line interface (CLI) command). The LLM component 106 may receive (via the natural language question answering service 102) a natural language question (or prompt) which asks for a command to be run in a network-based system which a user asking the question (or prompt) subscribes to. The LLM component 106 may gain access to the user's credentials (e.g., which services they are subscribed to, usage history, knowledge graphs of the customer, etc.) to generate an answer which can include API commands as an answer. For example, the natural language question answering service 102 may be associated with a network-based storage service. A customer of that network-based storage service may ask (e.g., question or prompt) the LLM component 106 how to create a bucket in that storage service as a natural language question. The LLM component 106 may then generate an answer which provides the API command to generate that bucket (e.g., the LLM component 106 may also run the API command for the customer). As another example, the natural language question answering service 102 may be associated with a network-based service (e.g., analytics, AI, storage, database, on-demand code execution, etc.). A customer of that network-based service may ask (e.g., question or prompt) the LLM component 106 the health or status of the network-based service (e.g., why is the service running slower than usual? is the service down? are there any technical issues with the service currently? etc.). The LLM component 106 may then generate an answer which provides the API command to check the health or status of the network-based service (e.g., the LLM component 106 may also run the API command for the customer). As another example, the natural language question answering service 102 may be associated with a network-based database service. A customer of that network-based database service may ask (e.g., question or prompt) the LLM component 106 to read or write (e.g., add rows or delete rows, etc.) to a database associated with that network-based database service. The LLM component 106 may then generate an answer which provides the API command to perform the read or write to the database (e.g., the LLM component 106 may also run the API command for the customer). As another example, the natural language question answering service 102 may be associated with a network-based on-demand code execution service. A customer of that network-based on-demand code execution service may ask (e.g., question or prompt) the LLM component 106 to initiate a function that the network-based on-demand code execution service will execute (e.g., a payroll function to pay employees, etc.). The LLM component 106 may then generate an answer which provides the API command to execute the function of the network-based on-demand code execution service (e.g., the LLM component 106 may also run the API command for the customer). As another example, the natural language question answering service 102 may be associated with a network-based artificial intelligence (AI) service. A customer of that network-based AI service may ask (e.g., question or prompt) the LLM component 106 to initiate an AI command that the network-based AI service will perform (e.g., a request for a command to predict when there will be a spike of purchases of a certain make of headphones, etc.). The LLM component 106 may then generate an answer which provides the API command (e.g., to perform the API command on the network-based AI service). After determining the type and kind of API command to generate on behalf of the customer, the LLM component 106 may then send the API command to the customer with a request or prompt as to whether the API command should be executed against the network-based service. The customer may respond to the LLM component 106 (e.g., or alternatively the natural language question answering service 102) and indicate to the LLM component 106 that the API command should be executed. After receiving a request to execute the API command, the LLM component 106 may execute the API command against the network-based service and send the customer a confirmation that the API command finished successfully.

Additionally, the LLM component 106 may additionally be trained to predict answers prior to being asked a question (or prompt). For example, the LLM component 106 may have knowledge graphs of customers of network-based services and additionally have access to actions performed by the customers while using a network-based service. In this example, movements, clicks, or other computing actions (e.g., via mouse, keyboard, audio listening device, other computing input devices, etc.) of the customers may be analyzed to determine if any patterns are matched which suggest the customers want to ask a natural language question (or prompt). As such, the LLM component 106 may prompt the customer if they want to ask a certain natural language question and provide answers before the customer asks the question.

At (7), the LLM component 106 sends the generated answer and retrieved passages to the verifier component 108. At (8), the verifier component 108 determines if the answer was generated in error (e.g., hallucinated). As stated above, the verifier component 108 may look for textual overlap between an answer and retrieved passages, determine whether there is a contradiction between the answers and the retrieved passages, use head/tail/relational triples to confirm faithfulness, use membership inference attacks techniques to confirm whether a question (e.g., or similar) is in a dataset, and/or a score of any of the four combined. At (9), if the answer was not hallucinated, the verifier component 108 sends the answer and retrieved passages to the attribution component 109.

At (10), the attribution component 109 may provide references to the retrieved passages, inline citations to sentences of retrieved passages used in the answer, or provide similar questions to the natural language question. For example, the attribution component 109 may provide reference links and titles to the retrieved passages used by the LLM component 106 (e.g., retrieved passages used as context to generate the answer), which may allow the submitter of the question to get more details on the referenced passages. As another example, the attribution component 109 may determine that a sentence (e.g., or span of words) from the retrieved passages was used directly (e.g., word for word or verbatim) in an answer generated by the LLM component 106, and cite that retrieved passage (e.g., or document associated with the retrieved passage) inline with the sentence (e.g., or span of words) used in the answer (e.g., the sentence used in the answer will have a citation citing the passage or document where the sentence was taken from). As another example, the attribution component 109 may provide questions related to the natural language question by referencing a dense index (e.g., dense index used to create a fixed-dimensional representation of prior questions) and retrieving the k closest questions to the natural language question. The references, inline citations, and similar questions may be provided, but not limited to, within the answer or after the answer generated by the LLM component 106.

At (11), the watermarking component 110 adds patterns to the answer to make the answer proprietary to the natural language question answering service 102 and verifiable against subsequent copying. In other words, the 110 may embed patterns into the generated text of the answer from the LLM component 106 that is invisible to humans but algorithmically detectable from a short span of tokens (e.g., group of words or where a token equals a single word or group of characters). Tokens may be selected prior to watermarking and the tokens may be promoted during the watermarking of the generated answer. At (11), the watermarking component 110 sends the watermarked answer and retrieved passages to the customer computing devices 122 such that a user of the customer computing devices 122 may view the answer and retrieved passages.

Figure 4:
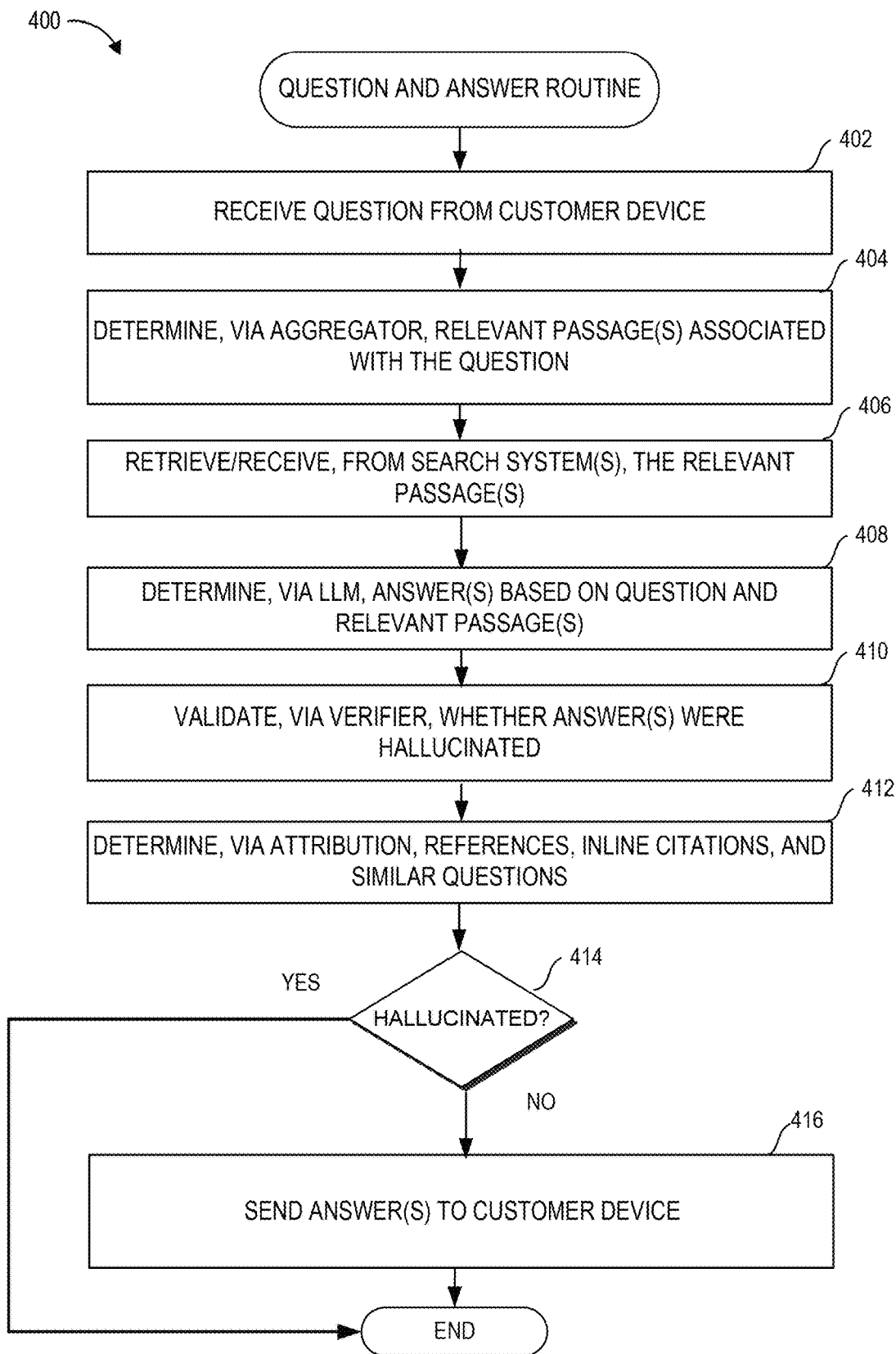
FIG. 4 is a flow diagram illustrative of a routine for the natural language question answering service answering a question in accordance with aspects of the present application.

FIG. 4 is a flow diagram illustrative of a routine for the natural language question answering service 102 answering a question, which will be described.

At block 402, the natural language question answering service 102 receives a natural language question (or prompt) from one of the customer computing devices 122 (e.g., where a user of the device entered the question via UI). As stated herein, the user of the customer computing devices 122 may be a customer of a network-based service associated with the natural language question answering service 102. Additionally, or alternatively, the question may be submitted or input via APIs. The question may also be generated by another generative model (e.g., not the LLM component 106) such that two models can effectively communicate with one another without human intervention. In this context, the user may seek an answer specifically related to the network-based service they have subscribed to. For example, the user may ask the natural language question answering service natural language question answering service 102 how to create a bucket in a network-based storage service. As another example, the user may ask the natural language question answering service 102 to create an API call, or create and run an API call (e.g., the user asks "please create a bucket for me named 'bucket3' in my network-based storage service").

At block 404, the natural language question answering service 102 may determine via the aggregator component 104, relevant passages to retrieve to answer the question (or prompt). As stated above, the aggregator component 104 may utilize partial string matching techniques to determine words or phrases from question input that may have been misspelled or mis-keyed by a user (e.g., user put in "Londin" but meant "London"). This is done to at least determine the meaning of the question.

At block 406, aggregator component 104 retrieves passages (e.g., documents, links, API calls, multimedia, etc.) related to the answer from the search systems 124. The aggregator component 104 may retrieve whole documents of from the search systems 124 or retrieve certain text (e.g., inline text) from documents but not the whole document. As stated herein, the passages may be retrieved in QA pair form which accompany the passages, among other forms of passages. The aggregator component 104 generates a prompt with some of the retrieved passages and the question where the prompt may comprise partial passages and associated QA pairs and some form of the original natural language question (or prompt). The aggregator component 104 may use a similarity score to determine whether the retrieved passages, and QA pairs, are above a threshold when compared to the natural language question (e.g., if above a threshold then the passages and QA pairs are allowed to be returned to the LLM component 106 as a prompt). As described above, the natural language question answering service 102 may optionally determine user context via the user context component 105 where the user context may also be provided to the LLM component 106 for the LLM component 106 to generate an answer.

At block 408, the natural language question answering service 102 determines via the LLM component 106, an answer (e.g., in human readable text) based on the prompt (e.g., and in some cases user context). The LLM component 106 may utilize RAG techniques to determine the answer. Moreover, the LLM component 106 may utilize customer information such as resource graphs which comprise subscription information of the customer (e.g., current storage usage, current processing usage, periods of CPU usage, etc.) to determine or refine an answer for the customer (e.g., the LLM component 106 determines a customer's service subscription will expire in the next month so includes in the answer that the customer should renew her service). The LLM component 106 may also generate API calls (or run them for the customer) based on the question (e.g., customer wants an API call to create a bucket in a network-based storage service and the LLM component 106 generates it). Additionally, the LLM component 106 may pre-determine questions for customers based on their activity (e.g., referencing a knowledge graph and determining that the customer likes links to other passages rather than answers with long text in the answer itself).

At block 410, the natural language question answering service 102 verifies, via the verifier component 108, that the answer was not generated in error (e.g., hallucinated) by using one or more techniques. The verifier component 108 may utilize a textual overlap module 234 to determine if there is overlap between the answer and the retrieved passages. The verifier component 108 may utilize a textual NLI interpretation module 236 to determine whether the answer contradicts the retrieved passages. Additionally, the verifier component 108 may utilize the relational NLI module 238 determine whether the answer generated from the LLM component 106 is not generated in error to the natural language question by using head, tail, and relation triples. Also, the verifier component 108 may utilize a membership inference attack module 240 to determine whether the question is similar to a question asked previously generated and is in a training set of the LLM component 106 (e.g., decide to answer the question based on whether the question, or some derivative, was already in the training set). Moreover, the answer, if verified, may receive a watermark via the watermarking component 110 where word patterns are generated into the answer which are unreadable by humans but may be used by the natural language question answering service 102 to determine that it generated the answer. In other words, the watermarking component 110 can take the generated answer from the LLM component 106 and re-order or re-phrase the words to create a pattern which the LLM component 106 can determine it generated while the pattern is unreadable to humans.

At block 412, the attribution component 109 determines references, inline citations, and similar questions. As stated above, the attribution component 109 may provide reference links and titles to the retrieved passages used by the LLM component 106 (e.g., retrieved passages used as context to generate the answer), which may allow the submitter of the question to get more details on the referenced passages. As another example, the attribution component 109 may determine that a sentence (e.g., or span of words) from the retrieved passages was used directly (e.g., word for word or verbatim) in an answer generated by the LLM component 106, and cite that retrieved passage (e.g., or document associated with the retrieved passage) inline with the sentence (e.g., or span of words) used in the answer (e.g., the sentence used in the answer will have a citation citing the passage or document where the sentence was taken from). As another example, the attribution component 109 may provide questions related to the natural language question by referencing a dense index (e.g., dense index used to create a fixed-dimensional representation of prior questions) and retrieving the k closest questions to the natural language question. The references, inline citations, and similar questions may be provided, but not limited to, within the answer or after the answer generated by the LLM component 106.

At block 414, the natural language question answering service 102 determines if the answer was generated in error (e.g., hallucinated). If the answer was generated in error, the routine ends. If not, at block 416, the answer and retrieved passages are sent to the customer computing device 122.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of customer computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable customer computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without customer input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for processing queries, the system configured to:
   receive, from a customer computing device and via a user interface (UI) associated with the customer computing device, a question in natural language text, the question regarding operation of a network-based service associated with a customer corresponding to the customer computing device;
   form, via an aggregator of the system, supplemental search system results based on the received question, wherein the supplemental search system results include one or more documents and portions of the one or more documents;
   generate a prompt based on the received question and a portion of the supplemental search system results;
   obtain information corresponding to the customer's use of the network-based service;
   pass, to a large language model (LLM) subsystem of the system, the prompt and the information corresponding to the customer's use of the network-based service to generate, via the LLM subsystem, one or more answers, wherein the one or more answers include an application programming interface (API) command to the network-based service;
   send, to the customer computing device, the one or more answers with the API command with a prompt as to whether the API command should be executed;
   receive, from the customer computing device, a confirmation to run the API command; and
   execute the API command against the network-based service.

2. The system as recited in claim 1, wherein the one or more answers comprise human readable text.

3. The system as recited in claim 2, wherein the supplemental search system results are also sent to the customer computing device.

4. The system as recited in claim 1, wherein in forming the one or more documents by the aggregator, the aggregator is configured to:
send, to the search system, requests to retrieve the one or more documents; and
receive, from the search system, the one or more documents.

5. A system for processing queries, the system comprising a memory storing computer-executable instructions and a processor configured to execute the computer-executable instructions to:
receive, from a customer computing device, a question regarding operation of a network-based service associated with a customer corresponding to the customer computing device;
form, via an aggregator of the system, relevant passages corresponding to search system results based on the received question;
obtain information corresponding to the customer's use of the network-based service;
pass, to a large language model (LLM) subsystem of the system, a prompt generated based on the question, the relevant passages, and the information corresponding to the customer's use of the network-based service to generate, via the LLM subsystem, one or more answers, wherein the one or more answers include an application programming interface (API) command to the network-based service;
execute the API command on the network-based service to completion; and
send to the customer computing device, the one or more answers and a notification of completion of the API command.

6. The system as recited in claim 5, wherein the relevant passages are also sent to the customer computing device.

7. The system as recited in claim 5, wherein the LLM subsystem comprises a Retrieval Augmented Generation (RAG) model.

8. The system as recited in claim 5, wherein the relevant passages are retrieved by the aggregator from a plurality of search systems, wherein the plurality of search systems include at least one of:
a search system configured to provide answers related to network-based storage systems;
a search system configured to provide answers related to network-based on-demand code execution systems;
a search system configured to provide answers related to network-based database systems; or
a search system configured to provide answers related to network-based on demand compute systems.

9. The system as recited in claim 8, wherein at least one of the plurality of search systems is configured to provide answers related to questions of customers of network-based systems.

10. The system as recited in claim 8, wherein at least one of the plurality of search systems is configured to provide answers related to frequently asked questions (FAQ) pages of network-based systems.

11. The system as recited in claim 8, wherein the LLM subsystem is configured to:
store information regarding the customers of network-based systems, wherein the information at least describes network-based products the customers are subscribed to and actions taken by the customers regarding the network-based products; and
train a machine learning model of the LLM subsystem with the stored customers' information to identify patterns of actions of the customers regarding the network-based products.

12. The system as recited in claim 5, wherein prior to sending the one or more answers to the customer computing device, the processor is further configured to execute the computer-executable instructions to: produce, via an attribution component of the system, one or more of (i) references, (ii) inline citations, or (ii) similar questions to the question, based on the one or more answers and the search system results.

13. A computer-implemented method for processing queries, the method comprising:
receiving, from a customer computing device, a question regarding operation of a network-based service associated with a customer corresponding to the customer computing device;
forming, via an aggregator, relevant passages to retrieve from search system results based on the received question;
obtaining information corresponding to the customer's use of the network-based service;
passing, to a large language model (LLM) subsystem of the system, a prompt generated based on the question, the relevant passages, and the information corresponding to the customer's use of the network-based service to generate, via a large language model (LLM) subsystem, one or more answers, wherein the one or more answers include an application programming interface (API) command to the network-based service;
executing the API command on the network-based service to completion; and
sending to the customer computing device, the one or more answers and a notification of completion of the API command.

14. The computer-implemented method of claim 13, wherein the relevant passages comprise of: documents, text of the documents, pictures of the documents, or video of the documents.

15. The computer-implemented method of claim 13, wherein the relevant passages are also sent to the customer computing device.

16. The computer-implemented method of claim 13, wherein the one or more answers comprise human readable text.

17. The computer-implemented method of claim 13, wherein the LLM subsystem comprises a Retrieval Augmented Generation (RAG) model.

18. The computer-implemented method of claim 13 further comprising prior to sending the one or more answers to the customer computing device, generating, via a watermarking module, a watermarked version of the one or more answers, wherein the watermarked version of the one or more answers is generated by embedding signals into human readable text associated with the one or more answers such that the embedding signals make the watermarked version of the one or more answers proprietary to the system.

19. The computer-implemented method of claim 13, wherein in forming the relevant passages by the aggregator, the aggregator is configured to:
sending, to a search system, requests to retrieve the relevant passages; and
receiving, from the search system, the relevant passages.

20. The computer-implemented method of claim 13, further comprising, prior to sending the one or more answers to the customer computing device, producing one or more of (i)

references, (ii) inline citations, or (ii) similar questions to the question, based on the one or more answers and the relevant passages.

* * * * *